United States Patent [19]

Holzman

[11] 4,424,679
[45] Jan. 10, 1984

[54] CONSTANT THRUST HYBRID ROCKET MOTOR

[75] Inventor: Allen L. Holzman, Cupertino, Calif.

[73] Assignee: The United States of America as represented by the Secretary of the Air Force, Washington, D.C.

[21] Appl. No.: 300,766

[22] Filed: Sep. 10, 1981

[51] Int. Cl.³ .............................................. F02K 9/56
[52] U.S. Cl. ........................................ 60/251; 60/258
[58] Field of Search ................ 60/251, 254, 258, 240; 137/110, 599; 251/117, 139, 65

[56] References Cited

U.S. PATENT DOCUMENTS

| | | | |
|---|---|---|---|
| 1,883,240 | 10/1932 | Phelan ................................. | 251/117 |
| 3,041,828 | 7/1962 | Broders et al. ...................... | 60/240 |
| 3,058,303 | 10/1962 | Mulready ............................. | 60/240 |
| 3,156,092 | 11/1964 | Holzman ............................. | 60/35.6 |
| 3,272,770 | 9/1966 | Lundahl ............................... | 60/35.3 |
| 3,373,564 | 3/1968 | Maybin ................................ | 60/204 |
| 3,390,698 | 7/1968 | Carmichael et al. ................ | 251/117 |
| 3,636,712 | 1/1972 | Kaufmann ........................... | 60/260 |
| 3,702,536 | 11/1972 | Gregory .............................. | 60/240 |
| 3,740,946 | 6/1973 | Welton et al. ....................... | 60/258 |
| 4,000,613 | 1/1977 | Fukumoto et al. .................. | 60/251 |
| 4,286,767 | 9/1981 | Hashimoto .......................... | 251/65 |
| 4,341,224 | 7/1982 | Stevens ............................... | 251/117 |

*Primary Examiner*—Carlton R. Croyle
*Assistant Examiner*—Jeffrey A. Simenauer
*Attorney, Agent, or Firm*—Donald J. Singer; Jacob N. Erlich

[57] ABSTRACT

A constant thrust hybrid rocket motor having a valve assembly therein which utilizes a fixed diameter orifice in combination with a valve having a variable sized opening therein in order to provide a regulated flow of oxidizer to the combustion chamber of the rocket motor. By selecting the size of the fixed diameter orifice such that it is slightly less than required to yield oxidizer flow at highest density oxidizer conditions (lowest temperature) and selecting the size of the combination of the fixed orifice and the open position of the variable opening such that it is slightly greater than required at lowest density oxidizer conditions (highest temperature), the operation of the rocket motor can be reliably maintained over a wide temperature range and without experiencing wide pressure variations by regulating the size of the variable opening.

2 Claims, 2 Drawing Figures

CONSTANT THRUST HYBRID ROCKET MOTOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to hybrid rockets, and, more particularly to a constant thrust hybrid rocket motor capable of maintaining operation over a wide temperature range.

An excellent example of a hybrid rocket motor is set forth in U.S. Pat. No. 3,156,092 by this inventor. As described therein the hybrid rocket motor is a small, easily transportable rocket motor which utilizes a safe combustion system operating with safe propellants. It is completely restartable due to its self contained ignition system and the motor combustion can be viewed through the actual propellant fuel. Therefore, it is especially useful as a laboratory tool for the evaluation of chamber configuration, oxidizer flow rate, grain length, grain composition and the like.

More specifically, the hybrid rocket motor includes a combustion chamber of an oxidizable semi-transparent plastic such as Plexiglas (polymethylmethacrylate, also known as Lucite), polystyrene, polyethylene, Teflon, polybutyrate or the like. The plastic serves both as the actual fuel during operation and also as a transparent chamber so that one can watch the action of the hybrid rocket motor. Plexiglas is ideal for this purpose since it serves as a typical hybrid fuel when used with oxygen and is clean-burning, and does not emit a carbonaceous exhaust. Furthermore, it is a thermal plastic which is readily available as a molding powder as well as in rods and tubes, so that combustion chambers of any desired configuration can be fabricated without difficulty. Since oxygen and plastic are not hypergolic, an electric ignition system can form part of the hybrid unit.

Unfortunately, the hybrid rocket motor is subject to a wide temperature range of, for example, −65° F. through +145° F. As a result of this temperature difference the pressure variation in the oxygen tank can range from between 2500 to 5500 psia. In fact, after passing through a constant pressure regulator, the temperature extremes drop to −200° F. and 22° F. respectively at 200 psi. Even the utilization of a feedback signal from a transducer to open and close a main solenoid valve feeding oxidizer into the combustion chamber still results in variations in chamber pressure of ±10–15%.

It is therfore clearly evident from the above description of the drawbacks associated with prior art hybrid rocket motors, that it would be highly desirable to provide a constant thrust hybrid rocket motor which would be capable of operating over wide temperature ranges of, for example, −65° F. through +145° F. without experiencing the pressure variations normally associated with such prior hybrid rocket motors.

SUMMARY OF THE INVENTION

The constant thrust hybrid rocket motor of this invention is capable of providing operation for at least 50 seconds over a wide temperature range and with minimal variation in chamber pressure thereby substantially overcoming the problems set forth in detail hereinabove.

The constant thrust hybrid rocket motor of this invention includes a combustion chamber containing a Plexiglas grain having at least one longitudinal port, an ignition squib or spark plug igniter associated therewith to ignite the hybrid rocket motor, an oxidizer source, a squib valve, a pressure regulator, and a solenoid valve, all elements being of the type disclosed in U.S. Pat. No. 3,156,092 referred to hereinabove. In addition thereto, and forming the inventive concept of the constant thrust hybrid rocket motor of this invention are means for creating a bypass around the solenoid valve.

This may be accomplished by the utilization of an actual bypass line having a fixed sized orifice in conjunction with a conventional solenoid valve and feedback transducer, or by incorporating within the hybrid rocket motor a unique solenoid valve which contains therein a constant flow orifice in combination with a feedback transducer.

In either case, the fixed bypass orifice alone is sized to yield the required flow at the highest density oxygen condition (the lowest temperature −200° F.). The solenoid valve orifice can be sized to give the required flow at the lowest density and highest temperature condition, approximately +145° F., when used in conjunction with the bypass flow orifice. Required flow during intermediate conditions are regulated by the positioning of the solenoid valve through signals from the feedback transducer. Since the squib valve adjacent the oxidizer source isolates the oxidizer from the rest of the system, the bypass flow has no adverse affect on hybrid rocket motor operation.

As a result of the inventive concept set forth in detail below the size of the flow orifice of the solenoid valve can be reduced, thereby reducing the overall size of the valve. The flow which passes through the solenoid valve adds to the constant base flow, and reduces the amplitude of the chamber pressure variation to less than ±4%.

It is therefore an object of this invention to provide a constant thrust hybrid rocket motor which is capable of providing constant thrust over a wide temperature range.

It is another object of this invention to provide a constant thrust hybrid rocket motor which substantially reduces variations in chamber pressure within the combustion chamber.

It is a further object of this invention to provide a constant thrust hybrid rocket motor which can utilize therein a smaller, lighter solenoid valve within the system.

It is still another object of this invention to provide a constant thrust hybrid rocket motor utilizing a solenoid valve having a constant flow orifice therein.

It is still another object of this invention to provide a constant thrust hybrid rocket motor which is economical to produce and which utilizes many conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 1:
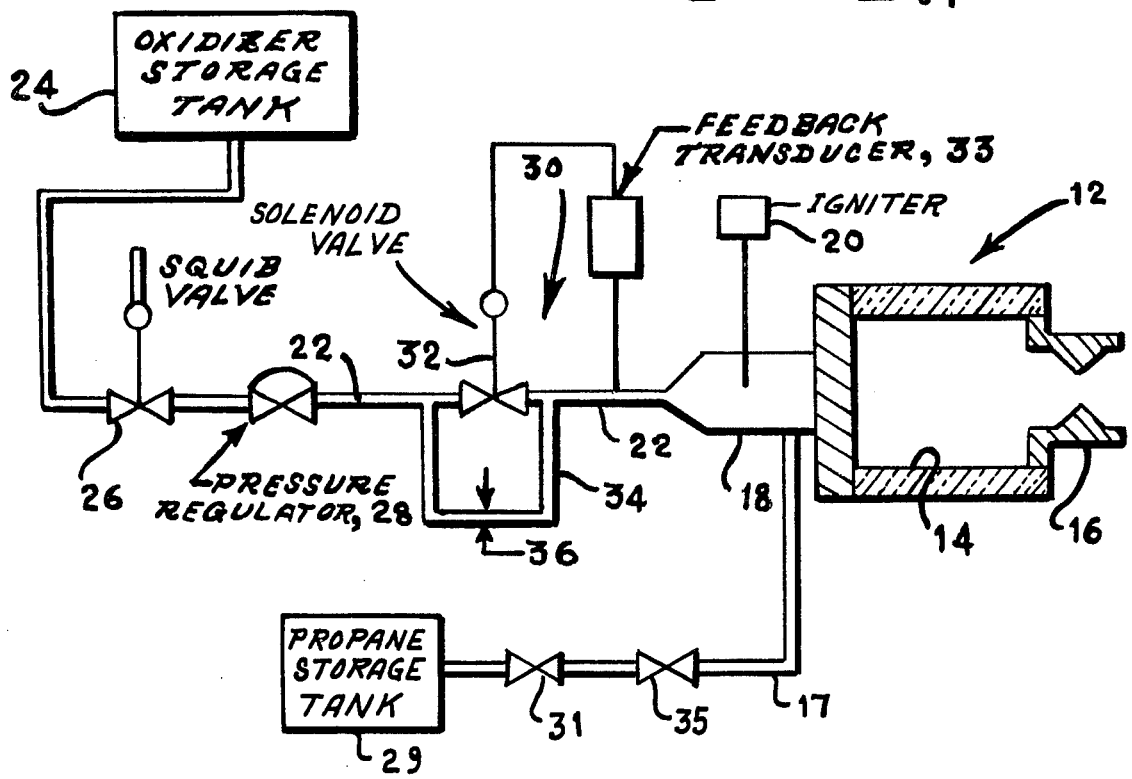
Figure 2:
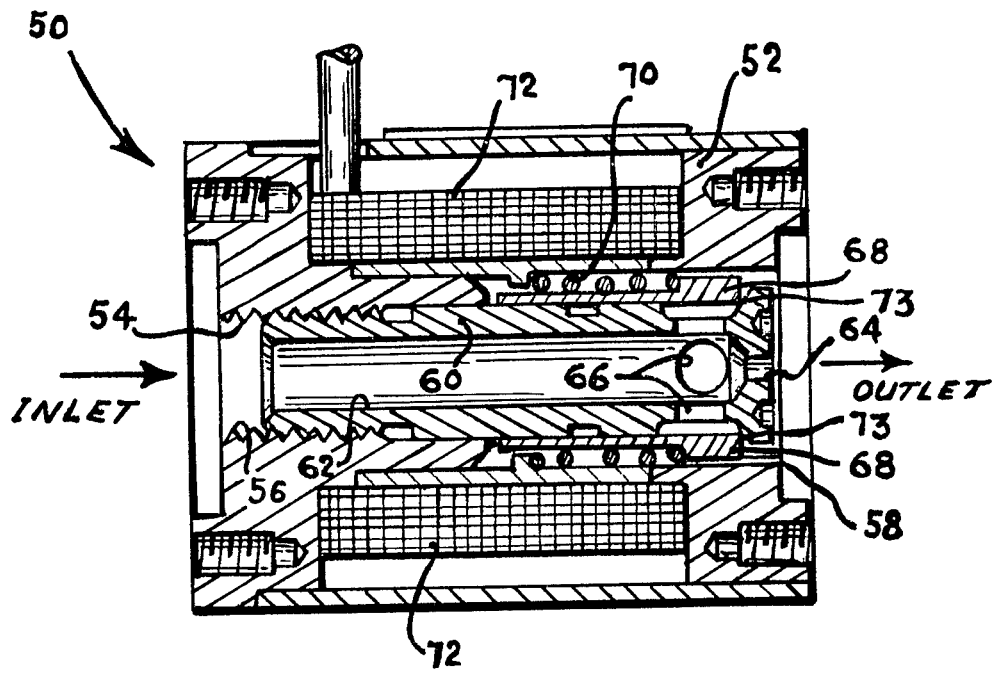

FIG. 1 is a schematic representation of the constant thrust hybrid rocket motor of this invention; and FIG. 2 is a side elevational view of the novel solenoid valve utilized with the constant thrust hybrid rocket motor of this invention and shown partly in cross-section.

DETAILED DESCRIPTION OF THE PREFERRED EMBODIMENT

Reference is now made to FIG. 1 of the drawing which illustrates schematically the constant thrust hybrid rocket motor 10 of this invention. Making up the constant thrust hybrid rocket motor 10 of this invention is a combustion chamber 12 fabricated of transparent plastic having a center burning port 14. Although port 14 has been shown as a straight tube, other configurations may be used, such as an internal burning rods of combustible material which might be suspended within port 14. At one end of the combustion zone of combustion chamber 12 is a nozzle 16, made preferably of metal, while at the other end is an ignition chamber 18, which may also be made of metal. Situated within ignition chamber 18 is a conventional spark plug igniter 20.

Any suitable oxidizer in the form of, for example, gaseous oxygen is provided to combustion chamber 12 of hybrid rocket motor 10 of this invention by means of oxidizer line 22 interconnected between ignition chamber 18 and a suitable oxidizer storage tank 24. Situated adjacent storage tank 24 may be a conventional squib valve 26 and pressure regulator 28. Controlling the flow of the oxidizer is a fluid flow control assembly 30 which forms the essential part of the present invention.

In addition, as pointed out in U.S. Pat. No. 3,156,092, propane may be provided to ignition chamber 18 by a propane line 17 for purposes of aiding in the ignition. Propane is supplied from a propane storage tank 29 through valve 31 to a propane solenoid valve 35.

More specifically, the fluid flow control assembly 30 which regulates the flow of oxidizer into ignition chamber 18 and combustion chamber 12 of the hybrid rocket motor 10 of this invention incorporates therein a solenoid valve 32, a feed back transducer 33 and a bypass line 34 having a fixed size orifice 36 located therein. Orifice 36 is made of a predetermined diameter, the design of which will be set forth in detail hereinbelow.

It has been determined by the inventor that two effects cause a wide variation in the gaseous oxygen density delivered by pressure regulator 28 to a valve located upstream of the hybrid combustion chamber 12. These two effects are due to the system soak temperature range, approximately −65° F. to +145° F., and the Joule-Thomson effect, the cooling down of the gaseous oxygen as it expands from the high tank pressure to the much lower regulated pressure. The maximum density occurs at the lowest gas temperature (approximately −200° F.) and the minimum density occurs at the highest gas temperature (approximately +145° F.).

By designing bypass line 34 with a fixed size orifice 36, sized to give the desired flow rate at maximum density conditions, operation could take place without valve 32 having to be opened at the lowest gas temperature. By combining the size of the bypass orifice 36 with the size of the orifice of solenoid valve 32 such that the combined size gives the desired flow rate at the minimum density conditions, solenoid valve 32 could remain open during the highest gas temperature. Any intermediate density condition (i.e. temperatures) would require actuation or deactuation of valve 32 to maintain the desired flow rate. This actuation or deactuation can be performed in accordance with signals from a conventional feedback transducer 33 in oxidizer line 22. In all cases the orifices are sized to operate as sonic chokes; the flow being only a function of upstream pressure and temperature and uninfluenced by downstream conditions.

More succinctly, this invention resides in using bypass line 34 to provide a continuous flow of oxidizer to ignition chamber 18 and combustion chamber 12. For practical purposes, however, bypass orifice 36 is sized slightly less than required to give the desired base flow rate at the highest density (lowest temperature) oxygen condition. In that way by slightly opening valve 32 the desired flow rate can be achieved. As the density of the oxygen decreases, the volumetric flow rate must necessarily increase. The solenoid valve 32 can be used to supplement the constant flow through bypass orifice 36. Also for practical purposes the orifice in solenoid valve 32 is sized such that in combination with orifice 36 it is sized slightly larger than required to yield the desired flow rate at the lowest density (highest temperature) oxygen conditions. As a result, during operation solenoid valve 32 never need be fully closed or fully opened.

For example, a bypass line orifice 36 of 0.070 inch diameter can be used to give a base flow to combustion chamber 12. As a result of this bypass line 34 and fixed orifice 36 a smaller solenoid valve can be used than in the past. An example of an equivalent diameter opening within the solenoid valve 32 could be, for example, 0.093 inches. The flow through valve 32 adds to the constant base flow, and reduces the amplitude of the chamber pressure variation to less than ±4%. Accordingly, by appropriate combination of the flows through the bypass and solenoid valve, a constant combustion chamber pressure in the hybrid rocket motor of this invention can be obtained.

For convenience and in some instances greater effectiveness, the fluid flow control assembly 30 made up of solenoid valve 32 and bypass line 34 as shown in FIG. 1 can be replaced by a single solenoid valve 50 having a fixed size orifice situated therein. Such a valve 50 is clearly depicted in FIG. 2 of the drawing and a detailed description thereof is set forth hereinbelow.

Valve 50 is made up of a housing or an assembly 52 having a longitudinally extending passageway 54 therein with one end 56 thereof being the inlet end and the other end 58 being the outlet. Located within passageway 54 is a fixedly mounted poppet 60 having a longitudinally extending central passageway 62 terminating at one end thereof in a fixed size (bypass) orifice 64. The size of orifice 64 is established in the manner described above for the size of orifice 36 with respect to bypass line 34.

Adjacent the end of poppet 60 containing orifice 64 are a plurality of radially extending openings 66 which interconnect passageway 62 to output end 58. Closing off openings 66 is an annular-shaped slidable seat 68 which is interposed between assembly 52 and poppet 60. Seat 68 is retained in the closed position (as shown in FIG. 2) by a spring 70 and can be energized to the open position by any suitable coil 72. The size of the opening 73 found between poppet 60 and seat 68 is equivalent to the size of the opening associated with solenoid valve 32 described with respect to FIG. 1 of the drawing. It should be realized, however, that the actual closed and open positions of valve 50 may be reversed if desired. In other words, seat 68 may be retained in the open position by a spring, and energized to the closed position by any suitable coil.

Coil 72 is electrically connected to feedback transducer 33. Input voltage to coil 72 is controlled by feedback pressure transducer 33 which causes valve 50 to close or open in accordance therewith in order to provide the desired flow rate through annular opening 73 of valve 50.

Valve 50, therefore, functions similar to the combination of solenoid valve 32 and bypass line 34 by providing a constant fixed size orifice 64 which is continually open to allow the oxidizer to flow between the tank 24 and combustion chamber 12 while in addition providing an additional variable outlet through opening 73 when an additional flow is desired. This invention therefore provides for the use of a smaller, lighter valve and a lower pressure variation in the desired constant downstream combustion pressure than achieved in the past.

Although this invention has been described with reference to a particular embodiment, it will be understood to those skilled in the art that this invention is also capable of a variety of alternate embodiments within the spirit and scope of the appended claims.

I claim:
1. A constant thrust hybrid rocket motor comprising:
a combustion chamber at one end thereof;
an oxidizer source at the other end thereof;
means interconnecting said combustion chamber and said oxidizer source for permitting an oxidizer to flow into said combustion chamber;
means operably connected to said flow permitting means for controlling the flow of said oxidizer therethrough, said flow controlling means including means for allowing a constant flow therethrough and means for allowing a variable flow therethrough, said constant flow control means being in the form of a by-pass line circumventing said variable flow control means, said by-pass line having a fixed diameter orifice of predetermined size, said variable flow control means being in the form of a solenoid valve having an opening which is operable from a closed position to an open position of predetermined size, said predetermined size of said fixed diameter orifice being of substantially such size as to yield required oxidizer flow to said combustion chamber at highest density oxidizer conditions and said predetermined size of said open position of said opening of said solenoid valve in combination with said predetermined size of said fixed orifice being of substantially such size as to yield required oxidizer flow to said combustion chamber at lowest density oxidizer conditions; and
means operably connected to said flow permitting means for monitoring said flow therethrough and providing a signal indicative thereof to said flow controlling means for regulating said variable flow control means;
whereby appropriate regulation of said variable flow control means in combination with said constant flow control means enables operation of said hybrid rocket motor to take place over a wide temperature range and without experiencing wide pressure variations.

2. A constant thrust hybrid rocket motor comprising:
a combustion chamber at one end thereof;
an oxidizer source at the other end thereof;
means interconnecting said combustion chamber and said oxidizer source for permitting an oxidizer to flow into said combustion chamber;
means operably connected to said flow permitting means for controlling the flow of said oxidizer therethrough, said flow controlling means including means for allowing a constant flow therethrough and means for allowing a variable flow therethrough, said constant flow control means and said variable control means of said flow controlling means being part of a single valve, said valve including a housing, said housing having a longitudinally extending passageway therein defining an inlet at one end thereof and an outlet at the other end thereof, and means within said passageway for containing said constant flow control means and said variable control means therein, said constant flow control means being in the form of a fixed diameter orifice of predetermined size adjacent said outlet and said variable control means being in the form of at least one opening and means operably associated with said opening for varying the size of said opening from the closed position to an open position of predetermined size, said predetermined size of said fixed diameter orifice being of substantially such size as to yield required oridizer flow to said combustion chamber at highest density oxidizer conditions and said predetermined size of said open position of said opening in combination with said predetermined size of said fixed orifice being of substantially such size as to yield required oxidizer flow to said combustion chamber at lowest density oxidizer conditions; and
means operably connected to said flow permitting means for monitoring said flow therethrough and providing a signal indicative thereof to said flow controlling means for regulating said variable flow control means;
whereby appropriate regulation of said variable flow control means in combination with said constant flow control means enables operation of said hybrid rocket motor to take place over a wide temperature range and without experiencing wide pressure variations.

* * * * *